Sept. 17, 1935.  J. FIUMEFREDDO  2,014,494
SCOURING PAD HANDLE
Original Filed March 21, 1933
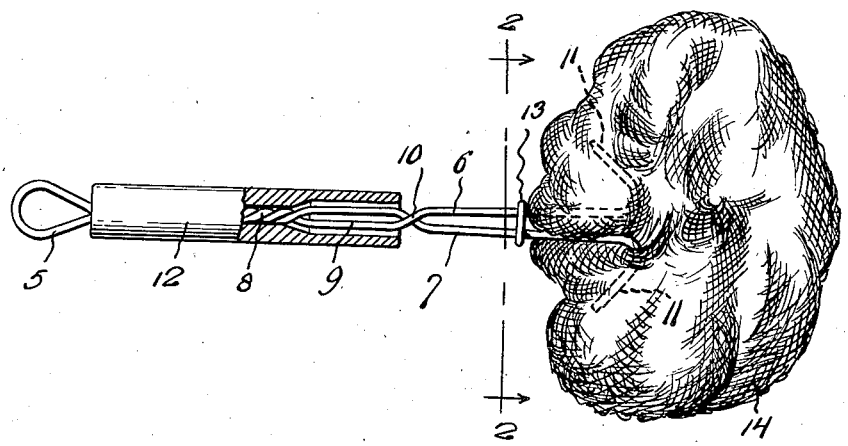
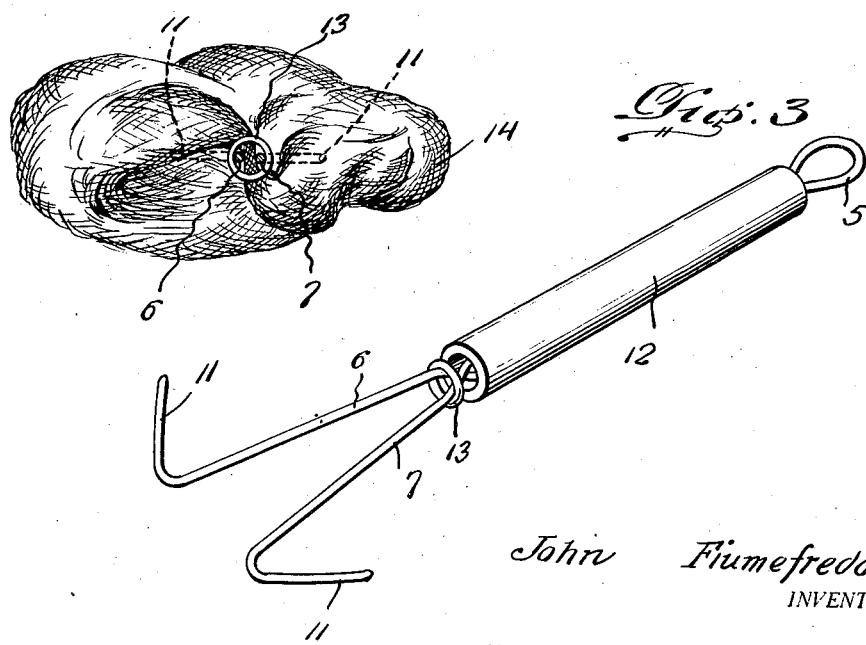
John Fiumefreddo,
INVENTOR.
BY J. Stanley Burch
ATTORNEY.

Patented Sept. 17, 1935

2,014,494

UNITED STATES PATENT OFFICE 2,014,494

SCOURING PAD HANDLE

John Fiumefreddo, Chicago, Ill.

Application March 21, 1933, Serial No. 661,992
Renewed February 12, 1935

2 Claims. (Cl. 15—154)

This invention relates to improvements in handles for removably holding a pad of steel wool or like material when used for scouring or cleaning kitchen utensils and the like.

The primary object of the present invention is to provide a scouring pad handle of the above kind which is extremely simple in construction and by means of which use of the pad is greatly facilitated.

A more specific object of the invention is to provide a handle of the above kind having simple and efficient means for positively engaging and gripping the scouring pad so as to insure against accidental detachment thereof from the handle while presenting the pad for most efficient use in the scouring operation.

Other objects and features of the invention will become apparent from the following description when considered in connection with the accompanying drawing, in which:

Figure 1 is an elevational view, partly broken away and in section, showing a scouring pad provided with a handle constructed in accordance with the present invention.

Figure 2 is a transverse section on line 2—2 of Figure 1; and

Figure 3 is a perspective view of the handle with the gripping members released and the scouring pad detached.

Referring more in detail to the drawing, the present scouring pad handle or holder comprises a member formed of a single piece of spring wire centrally bent upon itself to provide an open loop 5 at the bend and to present a pair of legs 6 and 7 whose inner portions are twisted together as at 8 and whose intermediate portions are then separated and extended for a short distance parallel with each other as at 9, after which the legs are bent to cross each other as at 10. After crossing each other, the outer portions of the legs 6 and 7 extend outwardly in slightly diverging relation and terminate in free outer ends 11 extending outwardly at an acute angle with their respective legs.

A tubular handle 12 is slipped onto the wire member as far as the loop 5 will allow before the intermediate and outer portions of the legs are separated and bent at 9 and 10 and before the ends 11 are bent into position, the handle tightly fitting the shank of the wire member formed by twisting the leg portions thereof as at 8. The outer end of the handle 12 has its bore slightly enlarged to accommodate the parallel portions 9 of the legs 6 and 7 with sufficient clearance to permit relative lateral movement of these portions and allow the outer portions of the legs 6 and 7 to assume their normal separated slightly diverging condition as shown in Figure 3. It will of course be understood that the outer portions of the legs 6 and 7 are resilient and normally tensioned to assume their diverging relation as shown in Figure 3.

Slidable on the outer portions of the legs 6 and 7 is a ring 13 which, when retracted to the part 10 where the legs cross each other, releases the outer portions of said legs and permits them to expand to their normally diverging relation as shown in Figure 3, and which, when slid outwardly, contracts the outer portions of the legs 6 and 7 toward each other for firm gripping engagement with the inner portion of a scouring pad 14 placed between such outer portions of the legs. The scouring pad 14 is of ordinary or well known construction, consisting of a quantity of steel wool or the like, and in use the pad is placed between the outer portions of the legs 6 and 7 when the ring 13 is retracted to the position of Figure 3, portions of the pad being engaged with the outwardly directed ends 11 of the legs 6 and 7. The ring 13 is then slid outwardly so as to grip the pad between the outer portions of the legs 6 and 7 and to crowd the adjacent portion of the pad into positive engagement with the hooked ends of the legs formed by the portions 11. The portions 11 positively prevent accidental detachment of the pad which is crowded into firm engagement with said ends 11 by the ring 13 when it is slid to the position of Figure 1, the pad being also tightly gripped between the outer portions of the legs as seen in Figure 2. When the pad has served its usefulness, it may be readily removed so that a new one may be substituted therefor, simply by retracting ring 13 and then disengaging the pad from the outwardly and rearwardly directed ends 11 of the legs.

It will be seen that the present holder or handle is extremely simple and durable in construction, inexpensive to manufacture and efficient in use.

What I claim as new is:

1. A scouring pad holder or handle including a member formed of a single piece of resilient wire centrally bent upon itself to form an open loop and to present a pair of legs having their inner portions twisted together to form a shank, the remaining portions of the legs being crossed at an intermediate point and then extended in normally diverging relation, said legs terminating in free outer ends extending outwardly at an acute angle with their respective legs and on which the pad is adapted to be engaged, and a ring slidable on the outer portions of the legs and movable outwardly to contract such outer portions of the legs toward each other into gripping engagement with the pad and to firmly crowd the pad into engagement with said free outer ends of the legs.

2. A scouring pad holder or handle including a member formed of a single piece of resilient wire centrally bent upon itself to form an open loop and to present a pair of legs having their inner portions twisted together to form a shank, the remaining portions of the legs being crossed at an intermediate point and then extended in normally diverging relation, said legs terminating in free outer ends extending outwardly at an acute angle with their respective legs and on which the pad is adapted to be engaged, and a ring slidable on the outer portions of the legs and movable outwardly to contract such outer portions of the legs toward each other into gripping engagement with the pad and to firmly crowd the pad into engagement with said free outer ends of the legs, a tubular handle tightly fitted on the shank against the open loop, said handle having its outer portion formed with an enlarged bore and extending outwardly to the point where the legs are crossed.

JOHN FIUMEFREDDO.